Aug. 1, 1967  W. R. MURRAY ETAL  3,333,666
ELECTRONIC MICROWAVE COOKING AND VENDING MACHINE
Filed Oct. 8, 1965  7 Sheets-Sheet 1

INVENTORS
WILLIAM R. MURRAY,
WILLIAM O. MURRAY,
BY
Berman, Davidson & Berman
ATTORNEYS.

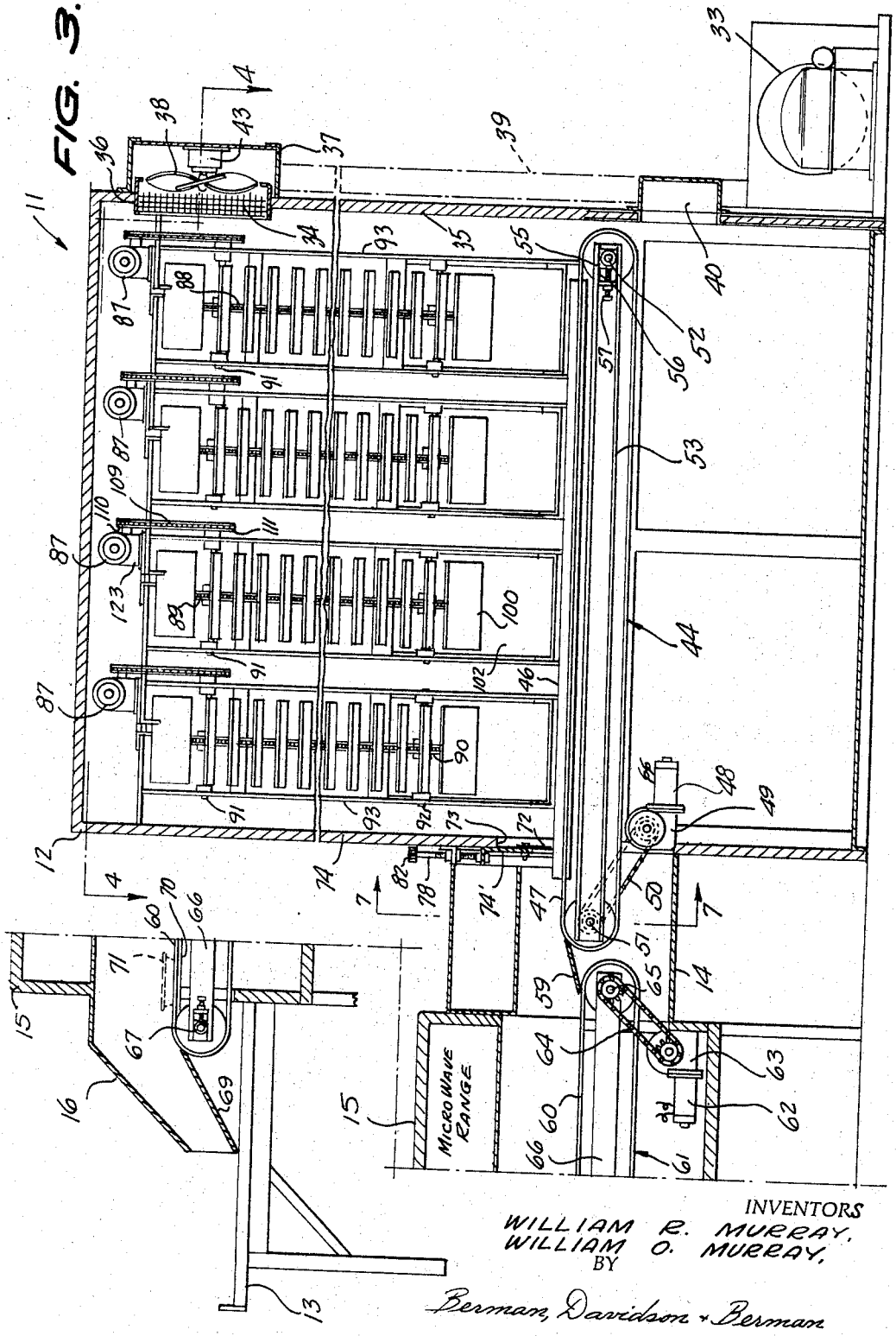

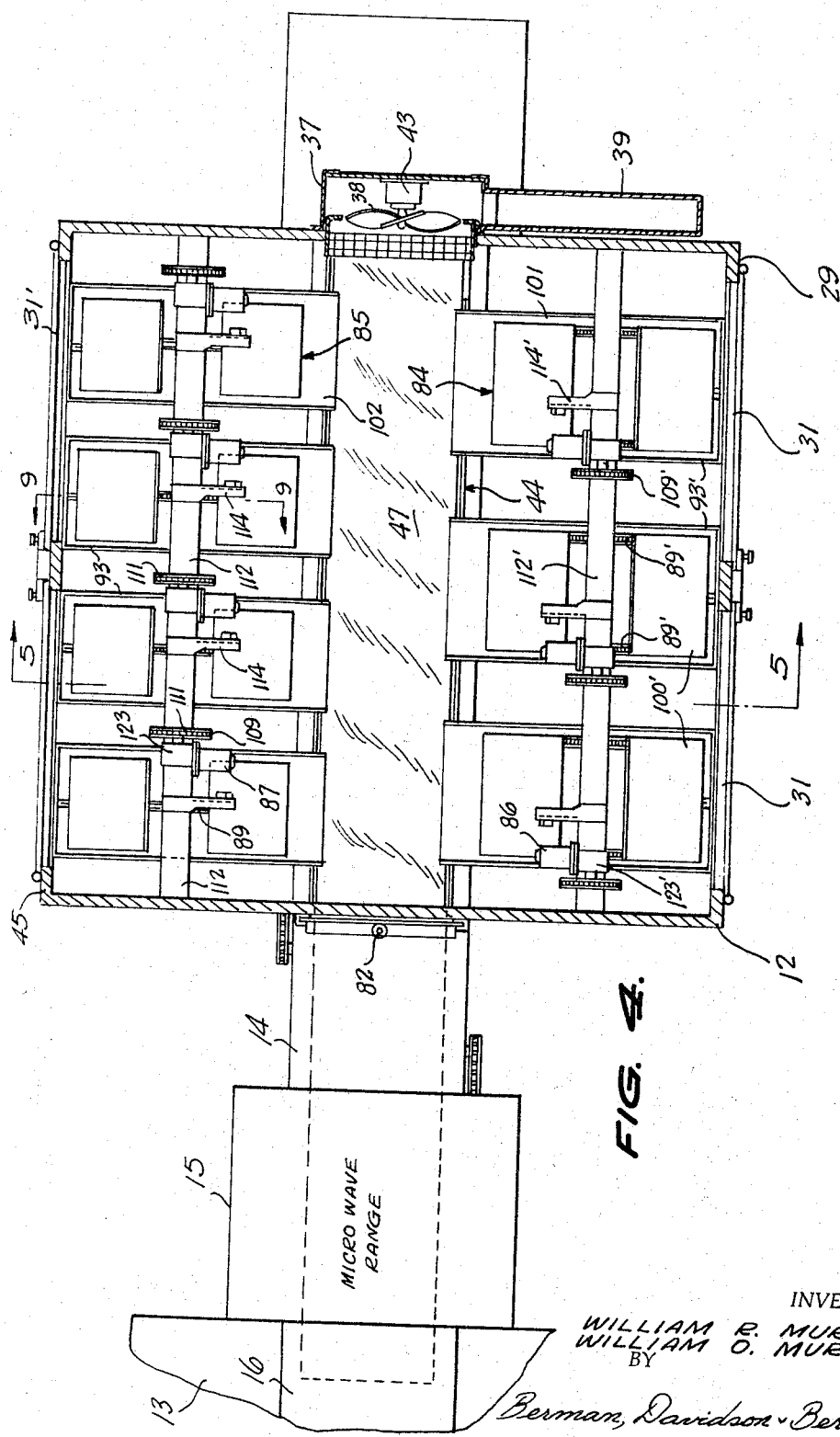

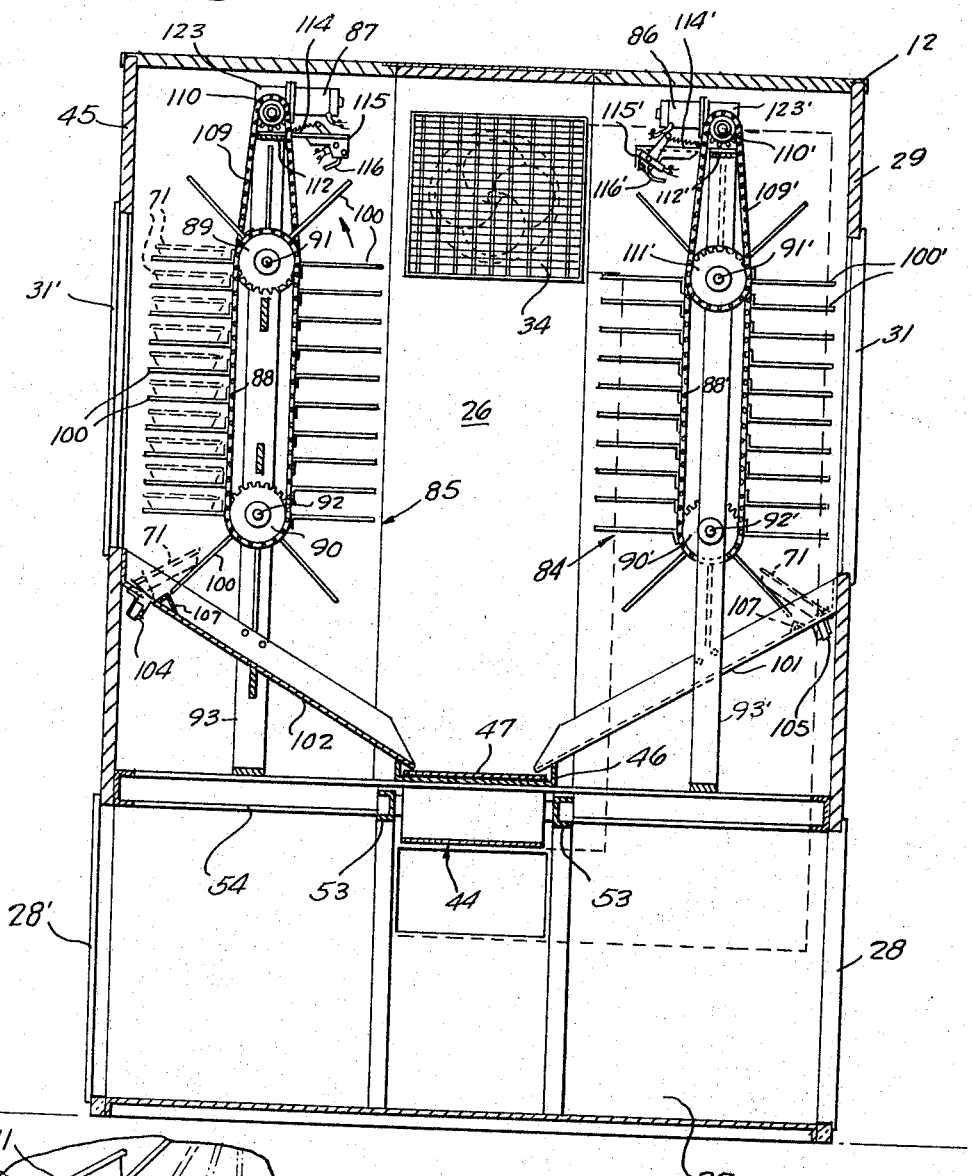

Aug. 1, 1967 W. R. MURRAY ETAL 3,333,666
ELECTRONIC MICROWAVE COOKING AND VENDING MACHINE
Filed Oct. 8, 1965 7 Sheets-Sheet 5

INVENTORS.
WILLIAM R. MURRAY,
WILLIAM O. MURRAY,
BY
Berman, Davidson & Berman
ATTORNEYS.

Aug. 1, 1967  W. R. MURRAY ETAL  3,333,666
ELECTRONIC MICROWAVE COOKING AND VENDING MACHINE
Filed Oct. 8, 1965  7 Sheets-Sheet 6

FIG. 11.

INVENTORS.
WILLIAM R. MURRAY,
WILLIAM O. MURRAY,
BY
Berman, Davidson & Berman
ATTORNEYS.

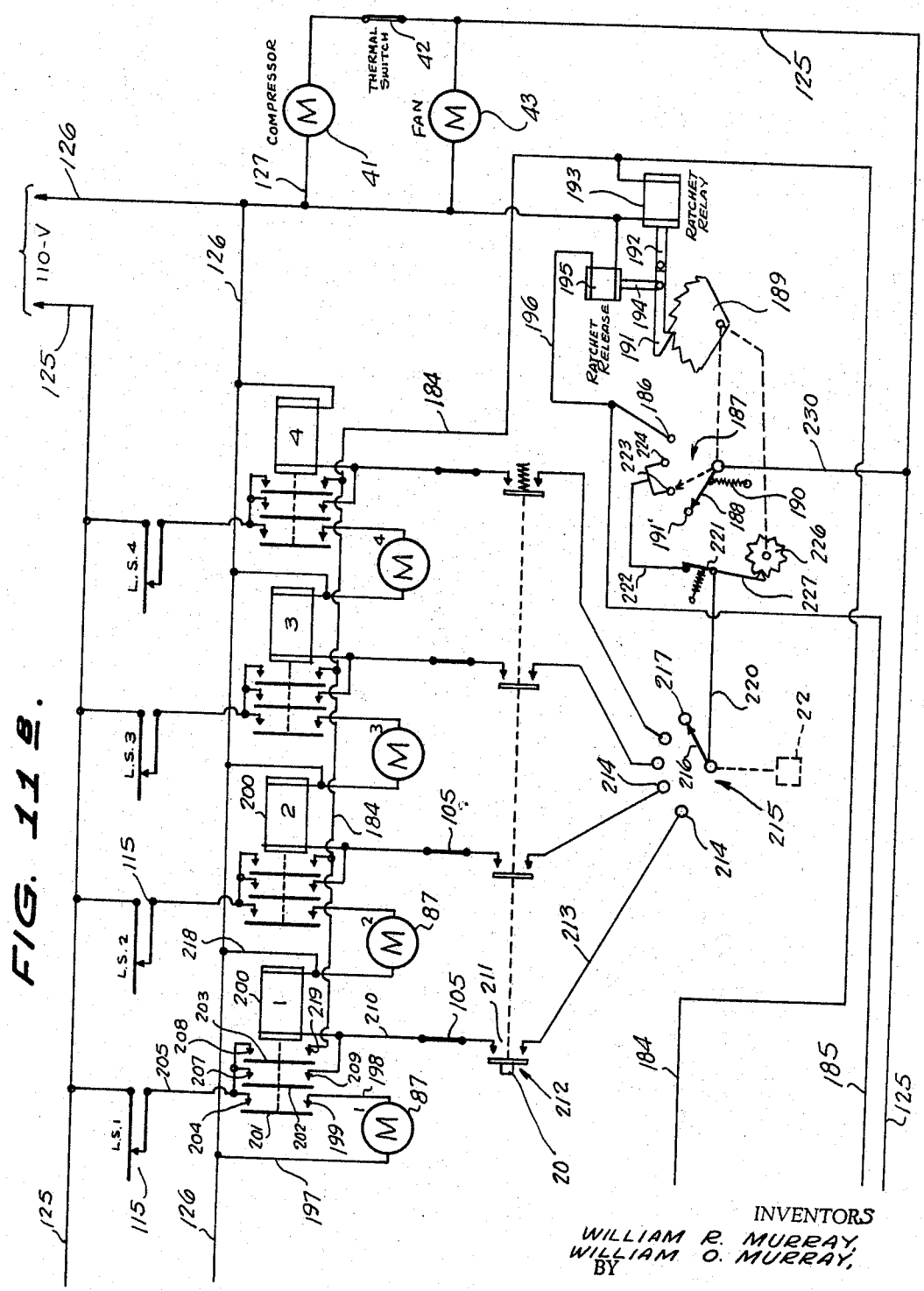

United States Patent Office 3,333,666
Patented Aug. 1, 1967

3,333,666
ELECTRONIC MICROWAVE COOKING AND VENDING MACHINE
William R. Murray and William O. Murray, both of
P.O. Box 88, Frankford, Del. 19945
Filed Oct. 8, 1965, Ser. No. 494,156
17 Claims. (Cl. 194—10)

This invention relates to automatic food cooking and dispensing machines, and more particularly to a coin-controlled machine for selectively dispensing cooked food products, such as a selected meat dish and a plurality of selected vegetable dishes, whereby to enable a customer to obtain the ingredients of the main course of a meal without requiring the services of a waiter or other attendant.

A main object of the invention is to provide a novel and improved automatic coin-controlled dispensing machine for vending cooked food products, such as cooked meat dishes and cooked vegetable dishes, the machine being relatively simple in construction, providing storage space for holding an adequate supply of partially pre-cooked foods to be subsequently dispensed, and being provided with easily-accessible and reliable means to enable a customer to make a selection of desired food articles to be dispensed, for example, to select one meat dish and a plurality of vegetable dishes, according to his choice.

A further object of the invention is to provide an improved automatic food cooking and dispensing machine which involves relatively inexpensive components, which requires a minimum amount of maintenance, and which incorporates means for cooking selected food articles in accordance with the specific articles selected and in accordance with the time required to complete the cooking of the articles so that when they are dispensed they will be completely cooked, and ready for consumption.

A still further object of the invention is to provide an improved automatic coin-controlled dispensing machine for serving cooked food articles, the machine being provided with storage means for keeping a supply of frozen or pre-cooked food articles stored in the machine for future delivery, the machine being further provided with conveyor means arranged to contain a supply of various different partially pre-cooked food articles, said conveyor means being selectively actuated in accordance with the customer's choice, the selected food articles being carried through the machine and through a timed cooking oven which completes the cooking of the articles, in accordance with the articles selected, after which the completely cooked articles are delivered to the customer in a condition ready for consumption.

A still further object of the invention is to provide an improved automatic cooking and vending machine for enabling a customer to select various food articles, for example, a meat dish and a plurality of vegetable dishes, the machine being arranged to deliver the selected food articles to the customer after said articles have been properly cooked in the machine, the machine being provided with means to store frozen or partially pre-cooked articles prior to their delivery to a customer and being further provided with sufficient capacity to enable a wide range of selections of combinations of meat and vegetable dishes.

A still further object of the invention is to provide an improved automatic food cooking and vending machine which enables food articles to be cooked and dispensed without requiring contact with human hands, whereby the food articles are delivered with minimum risk of contamination, the machine being easy to keep in a clean and sanitary condition, being reliable in operation, and providing a wide range of choices of food articles or combinations thereof.

Further objects and advantages of the invention will become apparent from the following description and claims, and from the accompanying drawings, wherein:

FIGURE 3 is an enlarged longitudinal vertical cross-sectional view taken through the machine substantially on the line 3—3 of FIGURE 1.

FIGURE 4 is a horizontal cross-sectional view taken substantially on the line 4—4 of FIGURE 3.

FIGURE 5 is a transverse vertical cross-sectional view taken substantially on the line 5—5 of FIGURE 4.

FIGURE 6 is an enlarged fragmentary vertical cross-sectional view showing the upper portion of one of the food article-delivery troughs and illustrating the manner in which a selected dish of food drops onto the delivery trough and is guided thereby toward the high-speed delivery belt of the machine.

FIGURE 11A is a wiring diagram showing the electrical connections of a part of the electric circuit associated with the machine of FIGURES 1 to 10, namely, the circuitry associated with the meat-article side of the machine.

FIGURE 11B is a wiring diagram showing the remaining portion of the electrical circuit associated with the machine of FIGURES 1 to 10, and showing the elements associated with the vegetable food-article side of the machine.

Figure 1:
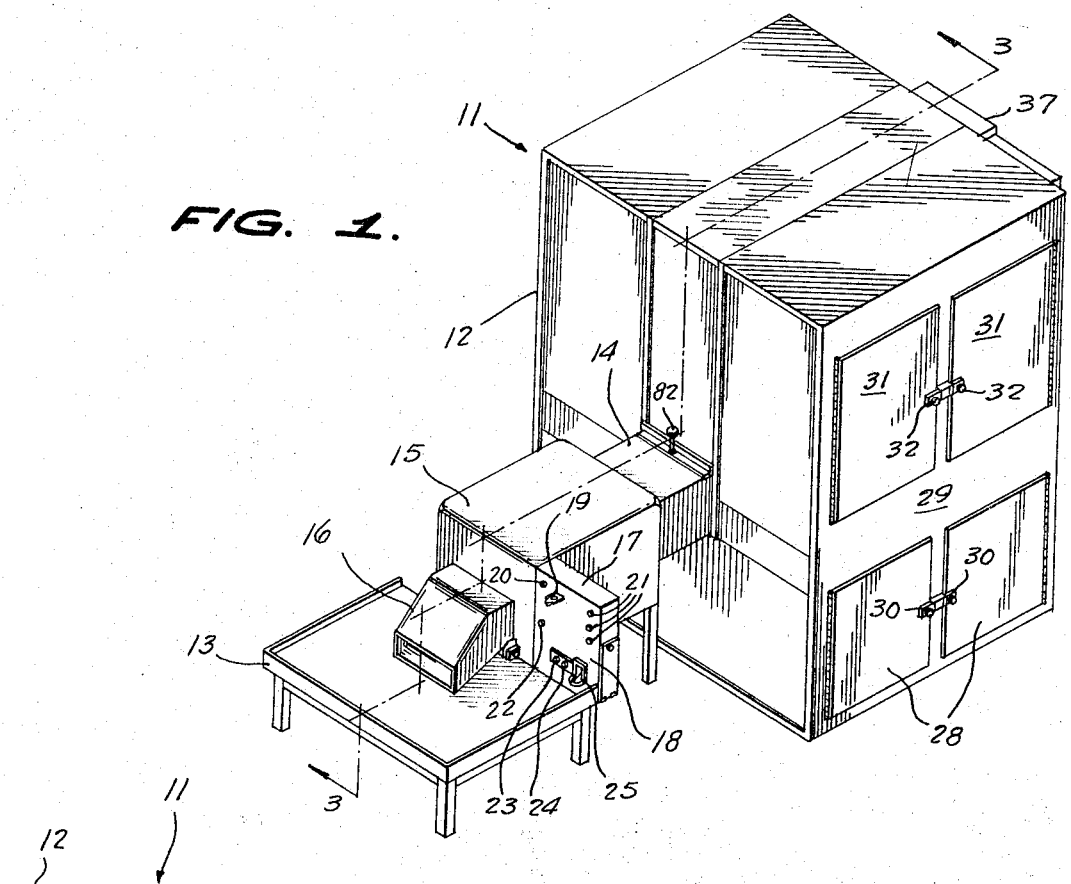
FIGURE 1 is a perspective view of an improved automatic food cooking and vending machine constructed in accordance with the present invention.
Figure 2:
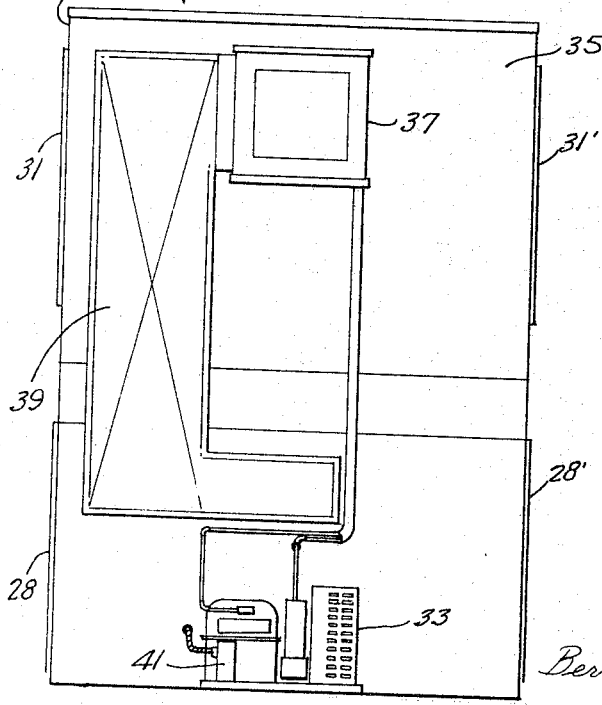
FIGURE 2 is a rear elevational view of the machine of FIGURE 1, showing the refrigeration compressor and air-circulation duct associated with the machine.

Referring to the drawings, 11 generally designates an improved coin-controlled automatic food cooker and dispenser constructed in accordance with the present invention. The dispenser 11 comprises the main food-storage cabinet 12 which includes refrigeration means for maintaining the interior thereof at a sufficiently low temperature to prevent deterioration of the food articles contained therein, presently to be described. Designated at 13 is a receiving table for cooked food articles delivered from the machine. As will be presently described, selected articles are conveyed through a conveyor duct 14 and through a high-frequency cooking oven, being delivered to the receiving table 13 through a discharge duct 16. A control cabinet 17 is secured to the forward end of the oven 15, projecting laterally therefrom, as shown, said cabinet being provided with a front panel 18 on which is mounted the coin-receiving member 19, the row of meat-selecting push buttons 21, a vegetable-selecting control knob 22, and a vegetable-delivering push button 20, as well as respective indicator lights 23 and 24 and a coin-return chute 25.

The cabinet 12 is generally rectangular in shape and comprises an upper working space 26 and a bottom storage space 27. The bottom storage space 27 is provided for the purpose of storing food articles to be subsequently dispensed after those provided in the upper working space 26 have become depleted. Access to the bottom storage compartment 27 is provided by means of doors 28, 28' in the lower portions of the sidewalls 29, 45 of the cabinet, said doors being provided with suitable latch assemblies 30, 30, as shown. Access to the working space 26 is obtained by the provision of similar doors 31, 31' in the upper portions of sidewalls 29 and 45, said doors having suitable latch assemblies 32, 32, as shown. As shown in FIGURE 1, the doors 28 and 31 are hinged on vertical axes located near respective front and rear right corner portions of cabinet 12, as viewed in FIGURE 1.

The cabinet 12 is provided with refrigeration means comprising a conventional refrigeration compressor 33 which furnishes compressed and cooled refrigerant to a cooling unit 34 mounted at the upper portion of the rear wall 35 of the cabinet, the cooling unit being disposed in a duct 36 extending through rear wall 35. A fan housing 37 is mounted over the duct in the manner illustrated in FIGURE 3, the housing containing a blower fan 38 arranged to force air through the cooling unit 34 and into the top portion of the cabinet 12. The air is delivered through a return duct 39 which communicates with a return register 40 provided in the lower portion of rear wall 35 so that air is circulated through the cabinet, being forced through the cooling unit 34 by the fan 38 and returning to the housing 37 through the return register 40 and the return duct 39. The compressor 33 is driven by a suitable electric motor 41, the motor being controlled by a conventional thermostatic switch 42 provided in the cabinet 12, whereby the compressor is energized when the temperature in the cabinet rises above a predetermined safe valve, thus insuring adequate and continuous refrigeration inside the cabinet and thus preventing deterioration of the food articles stored therein. Air is continuously circulated through the cabinet by the blower fan 38, the blower fan being provided with a driving motor 43. The thermostatic switch 42 may be located in any suitable portion of the interior of the cabinet, for example, in the upper portion of the working space 26 thereof.

A longitudinally-extending belt conveyor assembly, designated generally at 44, is mounted horizontally and substantially centrally in the cabinet 12, being located substantially midway between the sidewalls 29 and 45 of the cabinet, and shown in FIGURE 4. The belt conveyor 44 extends forwardly into the food article-transmission duct 14, and includes a stationary upwardly-facing channel-shaped top guide member 46 and an endless belt 47 whose top run is supported on the guide member 46, as shown in FIGURE 5. The endless belt 47 is driven in a counter-clockwise direction, as viewed in FIGURE 3, by an electric motor 48 through a suitable gear-reduction unit 49 and a sprocket-drive assembly comprising a sprocket chain 50 engaged with sprockets provided, respectively, on the output shaft of the gear-reduction assembly 49 and the belt-roller shaft 51 at the left end of the endless belt 47, as viewed in FIGURE 3. The right end belt-roller shaft 52 is adjustably-supported in the horizontally-extending belt-conveyor frame bars 53, 53 which, in turn, form part of the rigid framework of the machine. Thus, said rigid framework includes transversely-extending horizontal frame bars 54 which are rigidly-secured to the longitudinally-extending belt conveyor-supporting frame bars 53, 53. The right-end transverse belt roller supporting shaft 52 is supported in suitable bearing blocks 55 which are slidably-mounted in longitudinal slots 56 provided in the bars 53 and which are adjustably-positioned by means of abutment screws 57 so that the belt 47 may be adjusted to a desired degree of tightness.

Secured in the duct 14 is a downwardly and forwardly-inclined transfer plate 59 which extends from the left end of the top run of belt 47 toward the right end of the top run of a second horizontal conveyor belt 60 forming part of a belt-conveyor assembly 61 which passes through the high-frequency oven 15, as shown in FIGURE 3. The belt 60 is driven by an electric motor 62 through a suitable gear-reduction unit 63 and a sprocket chain driving assembly including a sprocket chain 64 connecting sprockets on the output shaft of the gear-reduction unit 63 and the right end transverse roller shaft 65 of the conveyor-belt assembly 61. The rollers associated with the belt 60 are supported in longitudinally-extending frame bars 66 rigid with the framework of the machine, namely, with framing contained in and supporting the housing of the high-frequency oven 15. The left end belt-roller shaft 67 is adjustably-supported in the frame bars 66 in the same manner as the right end roller shaft 52 associated with the belt-conveyor assembly 44 so that the belt 60 may be adjusted to a desired degree of tightness. The downwardly and forwardly-inclined bottom wall 69 of the discharge conduit 16 extends from the left end of the top run of belt 60, as viewed in FIGURE 3, toward the receiving table 13, terminating substantially at the table surface, as shown in FIGURE 3. The top run of the endless belt 60 is suitably-supported on a horizontal supporting plate 70 mounted in and extending longitudinally through the high-frequency oven 15.

Figure 7:
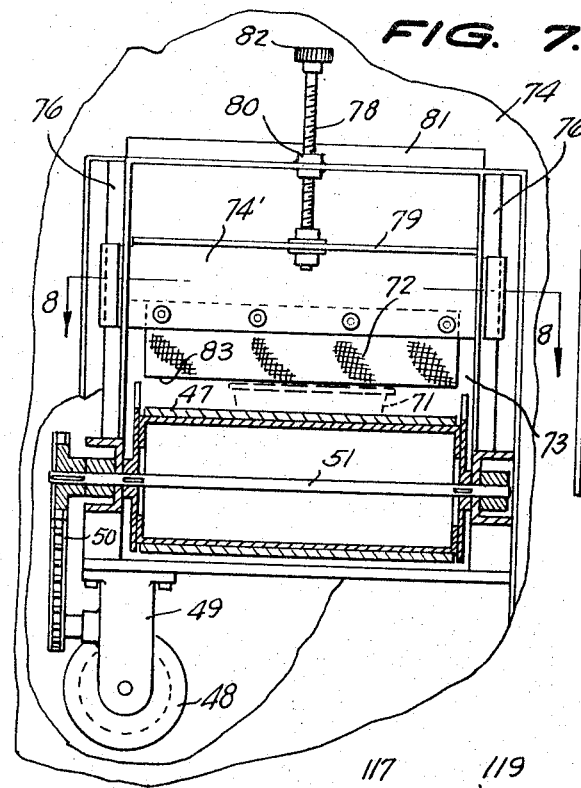
FIGURE 7 is an enlarged transverse vertical cross-sectional view taken substantially on the line 7—7 of FIGURE 3.
Figure 8:
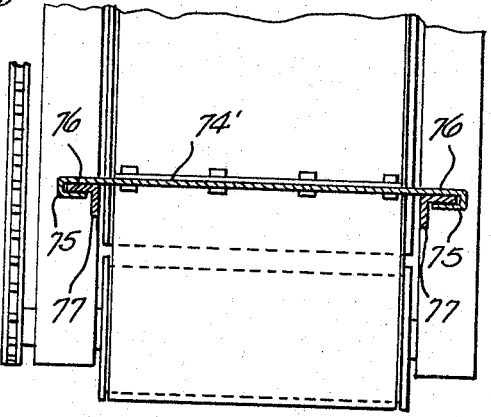
FIGURE 8 is a horizontal cross-sectional view taken substantially on the line 8—8 of FIGURE 7.

As will be presently described, tray-like receptacles 71 containing food articles are adapted to be conveyed on the initial conveyor-belt assembly 44 to the cooking and delivery conveyor-belt assembly 61 for ultimate delivery through the discharge conduit 16 to the table 13 after a timed period of traversal in the high-frequency over 15. A vertically-adjustable gate member 72 is provided in the exit opening 73 in the front wall 74 of the main cabinet 12 to insure that only one tray 71 at a time will pass from the top run of belt 47 onto the inclined plate member 59 and thence onto the top run of belt 60. Thus, a transversely-extending angle bar 74' is provided at its opposite ends with vertical channels 75, 75, as shown in FIGURE 8, said channels receiving the outwardly-projecting vertical flanges 76, 76 of respective fixed vertical angle bars 77, 77 so that the angle bar 74' is guided vertically adjacent the upper portion of the aperture 73. A vertical screw member 78 is rotatably-connected to the top flange 79 of angle bar 74' and there is threadedly-engaged through a vertical bushing 80 carried by the horizontal top angle bar 81 which is rigidly-secured to the top ends of the vertical angle bars 76, 76 and which is hereby rigidly-secured to the wall 74. The adjusting screw 78 is provided with a top adjusting knob 82 for manually-rotating the screw member 78, whereby to vertically-adjust the angle bar 74'. The gate member 72 comprises a piece of heavy canvas or similar flexible material which is secured to the lower margin of the bar member 74', as shown in FIGURE 7, with the bottom edge 83 of the gate member 72 spaced above and extending parallel to the top of belt 47. By rotating the screw 78 the bottom edge 83 of the flexible gate element 72 may be adjusted to a height corresponding to slightly more than the normal height of a food tray 71 so as to permit only one food tray to pass therebeneath.

Mounted in the left side of the cabinet 12, as viewed in FIGURE 5, are four vertical conveyors 85 adapted to contain the partly-cooked vegetable dishes and to ultimately deliver selected vegetable dishes to the central conveyor belt 47 in a manner presently to be described. Mounted in the right-side portion of the cabinet 12 are three vertical conveyors 84 adapted to contain respective partially-cooked meat dishes and arranged to ultimately deliver selected meat dishes to the central belt 47 in a manner presently to be described.

The vertical conveyors 85 comprise respective sprocket chains 88 engaged around top and bottom sprocket wheels 89 and 90 mounted centrally on respective horizontal shafts 91 and 92 which are journaled in respective vertical frames 93 fixedly-secured in the upper portion of cabinet 12, the upper shafts 91 having respective sprockets 111 secured to their outer ends, the sprockets 111 being drivingly-coupled by sprocket chains 109 to sprocket wheels 110 secured on the output shafts of gear-reduction units 123. The respective drive motors 87 drive said sprockets 110 through the gear-reduction units 123. The drive motors 87 associated with the respective vertical conveyors 85 and their associated gear-reduction units 123 are mounted on a horizontal-extending supporting bar 112 rigidly-secured in and extending longitudinally through the top portion of cabinet 12 at the left side thereof, as viewed in FIGURE 5.

Figure 9:
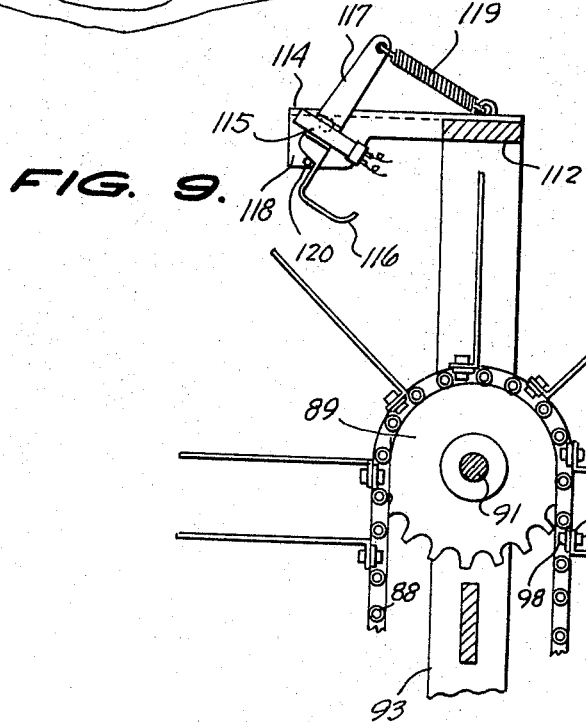
FIGURE 9 is an enlarged transverse vertical cross-sectional view taken substantially on the line 9—9 of FIGURE 4.
Figure 10:
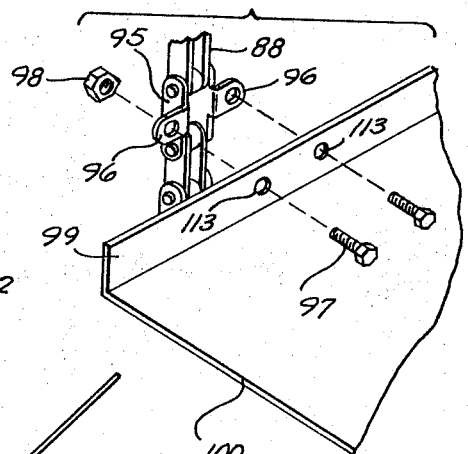
FIGURE 10 is an enlarged fragmentary perspective view showing the manner in which the food article-supporting trays of the vegetable conveyors are secured to the chain elements of the conveyors, the parts being shown in separated positions.

The sprocket chains 88 are provided with link brackets 95 which are uniformly-spaced around the sprocket chain, each of the brackets being provided with a pair of opposing, outwardly-projecting apertured lugs 96, 96. Secured to each of the pairs of lugs 96, 96 is an upstanding flange 99 of a respective tray-supporting shelf 100, the flange 99 being formed with central apertures 113, 113 registrable with the apertures in the lugs 96, 96 and said flange being thus centrally-secured to the lugs 96, 96 by bolts 97 having associated fastening nuts 98, as shown in FIGURES 9 and 10. Thus, the shelf or platform elements 100 are supported in outwardly-projecting positions by the chains 88. Trays 71 containing partly-cooked vegetable items are disposed on the leftward shelf elements 100, as viewed in FIGURE 5, to be ultimately delivered to downwardly and forwardly-inclined delivery troughs 102 provided beneath the respective vertical conveyors 85, said delivery troughs being rigidly-mounted in the cabinet 12 below the vertical conveyors 85 and terminating over the left marginal portions of the top run of conveyor belt 47, as viewed in FIGURE 5.

As shown in FIGURE 6, the lowermost tray 71 is normally supported in an inclined position on its associated shelf element 100, the bottom end of the tray element engaging the operating arm 103 of a microswitch 104 provided at the upper end of the associated inclined delivery trough 102, hereby keeping the microswitch 104 closed as long as a loaded tray 71 is present. As will be presently described, in the absence of a tray element 71, the associated drive motor is disabled.

A transversely-extended abutment rib 107 is provided at the top portion of each delivery trough 102, said abutment rib extending adjacent the bottom edge of the nearest platform element 100, under normal conditions. When the associated chain 88 is driven by its motor 87, the platform elements 100 move counterclockwise, as viewed in FIGURE 6, allowing the lowermost tray 71 to rotate over the generally triangular-shaped abutment rib 107 in the manner shown in dotted view in FIGURE 6, the tray member being released for downward-sliding movement on the inclined delivery trough 102 as its associated supporting shelf element 100 continues its counterclockwise rotation, as viewed in FIGURE 6 as will be presently described, each conveyor motor 87, when energized, operates for a timed period, sufficient to release the lowermost vegetable tray 71.

Mounted in the right side of the cabinet 12, as viewed in FIGURE 5, are three vertical meat-item conveyors 84 which are generally similar in construction to the conveyors 85, except that the platform elements 100' thereof are each connected at their opposite ends to sprocket chains 88', 88' engaged over the top and bottom sprocket wheels 89' and 90' mounted on respective horizontal shafts 91' and 92' journaled in vertical frames 93' rigidly-secured in the right-side portion of cabinet 12. The shafts 91' are driven by sprocket chains 109' connecting sprockets 111' on the shafts 91' to sprockets 110' on the output shafts of reduction units 123' associated with drive motors 86. The drive motors 86 and their associated reduction units 123' are mounted on a longitudinally-extending supporting bar 112' fixedly-secured in the top right portion of cabinet 12, as viewed in FIGURE 5.

The partly-cooked meat items are disposed on the rightward platform elements 100' of the associated vertical meat-item conveyors 84, the lowermost tray 71 of each conveyor normally engaging the operating element of a microswitch 105 provided at the top portion of a respective downwardly and inwardly-inclined receiving trough 101 provided beneath each vertical conveyor 84. As in the case of the microswitch 104, the microswitches 105 are normally kept closed by the presence of a loaded tray 71 engaged thereagainst.

As previously mentioned, respective doors 31, 31 are provided in the wall 29, whereby access is obtained to the vertical conveyors 84 for loading same. Similarly, doors 31' are provided at the left side of cabinet 12, as viewed in FIGURE 5, thereby providing access to the vertical conveyors 85 for loading same.

The upper ends of the receiving troughs 101 are provided with transversely-extending abutment members 107 similar to those provided at the upper portions of the receiving troughs 102, and providing the same type of movement of the meat trays, as above-explained, responsive to the clockwise movement of the lowermost platform element 100', as viewed in FIGURE 5, as the motor 86 of the associated meat conveyor 84 is energized. The clockwise movement of the lowermost shelf element 100' allows the meat tray engaged thereby to be released and to rotate over the subadjacent transverse abutment member 107 and thereafter, slide downwardly along the subadjacent receiving trough 101, to be eventually delivered to the top run of conveyor belt 47.

The motor-support bar 112 associated with the vertical vegetable-tray conveyors 85 has secured thereon respective horizontally-extending arms 114 to the ends of which are secured microswitches 115 having operating arms 116 depending in the path of movement of the outer edges of the support shelf elements 100, whereby the microswitch assemblies 115 are operated responsive to the counterclockwise rotation of the upper right shelf members 100, as viewed in FIGURE 5, causing the associated motors 87 to be de-energized, in a manner presently to be described. Similarly, the motor-support bar 112' associated with the meat-tray conveyors 84 is provided with horizontally-extending arms 114' carrying microswitches 115' provided with bottom operating arms 116' extending in the path of movement of the edges of the platform members 100' so that the switches 116' are operated responsive to the clockwise rotation of the upper left shelf elements 100', as viewed in FIGURE 5. As will be presently described, this de-energizes the motors 86.

As shown in FIGURE 9, the switches 115 and 115' may comprise switch assemblies of the mercury type pivotally-mounted on their associated supporting arms 114 and 114'. For example, the switch 115, shown in FIGURE 9, is mounted on a supporting body 117 pivoted to a depending vertical flange 118 provided on the bar 114. The lower end of the pivoted body 117 is formed with the operating arm 116 which is engaged by the outer edges of the shelf elements 100 as said shelf elements move clockwise, as viewed in FIGURE 9, in accordance with the movement of the associated sprocket chain 88, thereby causing the associated switch supporting body 117 to rotate counterclockwise, as viewed in FIGURE 9, against the biasing force of an associated coil spring 119 connecting the top end of the body 117 to the secured inner portion of the associated arm 114. Clockwise movement of the arm 117, as viewed in FIGURE 9, is limited by engagement of the depending bottom element 116 with a stop pin 120 provided on the bottom marginal portion of the adjacent depending flange 118. The mercury switches 115 are normally closed, as will be presently explained, but opened responsive to the counterclockwise swinging movement of their associated arms 117 caused by the engagement of the rotating shelf elements 100 with the actuating-arm portions 116. Under normal conditions, the springs 119 hold the supporting bodies 117 in the positions illustrated in FIGURE 9, in which positions the switch elements 115 are closed.

The switch assemblies 115′ associated with the vertical conveyors 84 operate in the same manner as the switches 115, except that the switches 115′ are arranged as single-pole, double-throw switches instead of single-pole, single-throw switches (see FIGURE 11A) for a purpose presently to be described.

Obviously, conventional mechanically-operating microswitches may be employed instead of switches of the mercury type.

As previously mentioned, the machine is provided with a control box 17 containing most of the electrical control devices associated with the apparatus. Referring to FIGURES 11A and 11B, it will be seen that the electrical components are energized from a pair of line wires 125 and 126. Thus, the motor 41 of the refrigeration compressor unit 33 has one terminal thereof connected to the line wire 126, as by wire 127, and has the other terminal thereof connected to line wire 125 through the thermal switch 42. The fan motor 43 is likewise connected across the line wires 126 and 125. Each of the meat dish-conveyor motors 86 has one terminal thereof connected to the line wire 126, for example, by respective wires 128. The other terminals of the meat-conveyor motors 86 are connected to the line wire 125 through the contacts of respective relays 129 and their associated limit switches 115′. Thus, each relay 129 is provided with two poles 130 and 131 and with associated stationary contacts 132 and 133. The terminal wire 134 of each motor is connected to a stationary contact 132, and its relay pole 130 is connected by a wire 135 to the lower contact 136 of the associated limit switch 115′. The pole 137 of said limit switch is connected by a wire 138 to line wire 125. The relay pole 131 is connected to wire 135 and the stationary contact 133 is connected to one terminal of the winding of the relay 129, the opposite terminal of said winding being connected by a wire 139 to the line wire 126. Relay contact 133 is connected through the associated product exhaust-indicating switch 104 to one stationary contact 140 of the associated meat dish-selecting push-button switch 21. The remaining stationary contact 141 of the push-button switch is connected by a wire 142 to a stationary contact 143 of a ratchet-operated rotary switch 144 having a rotary switch pole 145. This comprises the control circuit for the first motor 86.

The second meat-dish conveyor motor 86 has a similar control circuit including a relay 129 whose stationary contact 133 is connected through another push-button switch 21 to a further stationary contact 146 of the ratchet-operated rotary switch 144 spaced one or more steps in a clockwise direction from the first-named contact 143. The third meat dish-conveyor motor 86 is similarly provided with an energizing circuit controlled by a relay 129 whose stationary contact 133 is connected through its product exhaust-operated switch 104 and its selecting push-button switch 21 to still another stationary contact 147 of the ratchet-operated rotary switch 144 spaced in a clockwise direction, as viewed in FIGURE 11A, from the previously-mentioned stationary contact 146. The pole 145 is biased in any suitable manner, for example, by a spring 149 to an initial starting position wherein said pole 145 engages a first stationary contact 148. The pole 145 is drivingly-connected to a ratchet disc sector 150 which is actuated in stepped fashion by a pawl member 151 pivotally-connected to the plunger 152 of a ratchet solenoid 153. A ratchet-release solenoid 154 has its plunger 155 pivotally-connected to the pawl 151, whereby to disengage pawl 151 from ratchet sector 150 responsive to the energization of the release solenoid 154.

Each time that solenoid 153 is energized, it retracts the pawl member 151 a sufficient distance to rotate the sector 150 clockwise through one step, as viewed in FIGURE 11A, causing the switch pole 145 to similarly rotate through a corresponding angular step, the step corresponding to the angular spacing between the stationary contacts of the rotary-switch assembly 144. In a typical arrangement illustrated schematically in FIGURE 11A, four successive steps of energization of the ratchet solenoid 153 will bring the pole 145 from its starting position into engagement with the stationary contact 143. Two more steps of energization of the ratchet solenoid 153 will move the pole 145 into engagement with the stationary contact 146, and two more further steps of energization of the ratchet solenoid 153 will bring the pole 145 into engagement with the stationary contact 147.

One terminal of ratchet solenoid 153 is connected by wires 158 and 159 to line wire 126. The remaining terminal of solenoid 153 is connected through a wire 160 and a coin-operated switch 161 to wire 162. The wire 162 is connected through the pole 163 and contacts 164 and 165 of a normally de-energized timing relay 166 to wire 167 which is, in turn, connected to line wire 125.

The coin-controlled switch 161 is of conventional construction and is actuated by the insertion of a proper coin in the coin-receiving member 19 and subsequent reciprocation of the actuating element of the coin-receiving member. The switch 161 is provided with conventional coin-rejecting means, such as, the conventional reject mechanism designated generally at 169, connected across and energized from the wires 162 and 159.

A pilot lamp 23 is connected between wire 126 and wire 162, said lamp 23 being thus energized as long as the relay pole 163 engages contacts 164 and 165, since wire 162 is connected to wire 125 through said pole 163 and contacts 164 and 165 and the wire 167. Pilot lamp 23 which may be colored green, is thus normally energized, indicating that the machine is in a starting condition, ready for operation. The relay 166 is provided with another pole 171 mechanically-coupled to the pole 163 and moving into bridging engagement with stationary contacts 172 and 173 responsive to the energization of relay 166, simultaneously causing pole 163 to disengage from contacts 164 and 165. Relay 166 is of a conventional latched type which latches responsive to momentary energization thereof and maintains its latched condition for a predetermined period of time. Thus, when relay 166 is momentarily energized, pole 171 moves into engagement with contacts 172 and 173 and pole 163 disengages from contacts 164 and 165, this condition being maintained for a predetermined time, after which the poles resume their normal condition, shown in full-line view in FIGURE 11A, wherein pole 163 bridges contacts 164 and 165 and pole 171 is disengaged from contacts 172 and 173.

The main conveyor motor 48 has one terminal thereof connected to a wire 174 which is, in turn, connected to line wire 126. The remaining terminal of motor 48 is connected to a wire 175 which is, in turn, connected to relay contact 172. Relay contact 173 is connected to the wire 167, and thence, to the line wire 125, whereby energization of relay 166 causes motor 48 to become energized through a circuit comprising line wire 126, wire 174, the motor 48, wire 175, contact 172, relay pole 171, contact 173, wire 167 and line wire 125. Motor 48 remains energized for a period of time corresponding to the latching time of relay 166.

The oven-conveyor motor 62 is connected across the wires 174 and 175 through a speed-adjusting rheostat 180, which is set to provide the proper speed of motor 62 corresponding to the required cooking time for the products being conveyed through the oven 15. Thus, the conveyor 61 becomes energized simultaneously with the conveyor 44, but operates at a slower speed, in accordance with the adjustment of the rheostat 180. As in the case of the conveyor 44, the cooking conveyor 61 becomes energized responsive to the latching-down of relay 166.

A pilot lamp 24, which may be colored red, is connected across the wires 162 and 175, thus becoming energized responsive to the latching-down of relay 166 and remaining energized in parallel with the circuits of the motors 48 and 62.

Connected in parallel with said circuits, namely, connected across the wires 174, 175 is the control relay 182 for the high-frequency oven 15, so that said oven becomes energized simultaneously with the energization of the conveyor motors 48 and 62. As previously-mentioned, this occurs responsive to the latching-down of relay 166.

It will be readily apparent that in order to operate a selected meat dish-conveyor 84, it is necessary to insert a number of coins in the machine corresponding to the required number of steps of the ratchet sector 150 to bring the switch arm 145 into engagement with the stationary switch contact 143, 146 or 147 associated with the motor-control relay 129 controlling the motor of the selected conveyor. Thus, four coins are required to bring switch arm 145 into engagement with contact 143 in the typical arrangement illustrated in FIGURE 11A, six coins are required to bring switch arm 145 into engagement with stationary contact 146, and eight coins are required to bring the switch arm 145 into engagement with stationary contact 147. This provides for selection of one of three different meat dishes having different prices.

As previously-mentioned, when the push-button switch 21 corresponding to the selected meat dish is actuated, the associated relay 129 becomes energized and remains energized by the establishment of a holding circuit therefor through its contacts 131, 133 and the normally-closed mercury switch contacts 137, 136, leading to the line wire 125. The associated motor 86 remains energized as long as this holding circuit is intact. The conveyor operates to move its lowermost shelf element 100' downwardly, namely, to rotate said lowermost shelf element clockwise, as viewed in FIGURE 5, sufficiently to release the meat tray 71 previously supported thereby. As this occurs, the upper left tray element 100', shown in FIGURE 5, rotates clockwise, engaging and moving past the associated switch arm 116', causing the holding circuit contacts 136, 137 to open, allowing the associated control relay 129 to become de-energized. At the same time, the pole 137 engages the upper contact 183 of the associated switch 115', as viewed in FIGURE 11A, momentarily connecting line wire 125 to a wire 184, to which the respective upper switch contacts 183 of the switches 115' are connected. This energizes the ratchet-release relay 154 whose winding is connected across wires 158 and 184, as shown in FIGURE 11A. Energization of the release relay 154 elevates the pawl member 151 and allows spring 149 to return switch element 145 and ratchet-wheel sector 150 to their starting positions, wherein they remain until the cycle of operations is repeated by the next customer.

It will be seen that one terminal of the latched timing relay 166 is connected by the wire 162 to line wire 126, and the other terminal of said relay is connected by wire 185 to the fourth stationary stepped contact 186 of another ratchet-operated switch 187 having the rotary switch arm 188 and the ratchet-wheel sector 189 drivingly-connected thereto. Arm 188 is biased toward the starting position thereof shown in FIGURE 11B by a coiled return spring 190, which normally holds the arm 188 in engagement with the blank first stationary contact 191' of switch 187. Ratchet sector 189 is engaged by a pawl arm 191 pivotally-connected to the plunger 192 of a ratchet solenoid 193. Also pivotally-connected to the pawl member 191 is a plunger 194 of a ratchet-release solenoid 195. One terminal of the release solenoid 195 is connected by a wire 196 to wire 185, and the other terminal is connected to line wire 126. One terminal of ratchet solenoid 193 is connected to the line wire 126 and the other terminal thereof is connected to wire 184.

Each of the vegetable-conveyor motors 87 has one terminal thereof connected by a wire 197 to line wire 126. The remaining terminal of each motor 87 is connected by a wire 198 to one stationary contact 199 of a three-pole relay 200 having movable poles 201, 202 and 203. When relay 200 is energized, the movable pole 201 bridges stationary contacts 199 and 204, the contact 204 being connected through a wire 205 and the normally-closed associated mercury switch 115 to line wire 125.

Also connected to wire 205 are additional stationary contacts 207 and 208 of the relay 200. When the relay 200 is energized, the pole 202 bridges the contact 207 and the cooperating stationary contact 209. Contact 209 is connected to a wire 210 which is connected through the associated product-exhaust switch 105 and one section 211 of a multiple-section push-button switch 212 to a wire 213 which is connected to one stationary contact 214 of a manually-operated selector switch 215 actuated by the knob 22. As shown in FIGURE 11B, the rotary contact arm 216 of switch 215 is normally in engagement with a blank stationary contact 217, but may be manually-rotated to engage any selected one of the stationary contacts 214, in accordance with the desired selection of vegetable dishes to be dispensed. From FIGURE 11B it will be seen that the control relay 200 has one terminal thereof connected by a wire 218 to the line wire 126 and the other terminal thereof connected to wire 210.

From FIGURE 11B it will be seen that each of the motors 87 associated with the vegetable conveyors 85 is provided with a control relay 200 connected through a section 211 of the multiple-section push-button switch 212 to one of the stationary contacts 214 of selector switch 215, the circuits being similiar to that above-described in connection with the first control relay 200 associated with the initial section 211 of multiple-section switch 212.

Each pole 203 of the respective relays 200 is engageable bridgingly with stationary contact 208 and a cooperating stationary contact 219 responsive to the energization of the aforesaid relay. The contacts 219 of the relays are connected to the common wire 184.

The rotary switch arm 216 of the manually-adjustable switch 215 is connected by a wire 220 through a normally-closed cam-operated switch 221 to a wire 222. The second and third stepped contacts 223 and 224 of ratchet switch 187 are connected to the wire 222. Switch 221 is actuated by suitable cam means, such as a star wheel 226 drivingly-connected to ratchet sector 189 and engaging a follower arm 227 provided on the switch arm of switch 221 to open switch 221 while ratchet-wheel sector 189 is in motion. Thus, switch 221 remains closed only while the ratchet-sector member 189 is at rest.

As above-described, when the upper left meat-shelf element 100', shown in FIGURE 5, engages the switch-operating arm 116', it opens contacts 137, 136 and momentarily closes contacts 137, 183. This applies a pulse of voltage to ratchet solenoid 193 through a circuit comprising line wire 126, the winding of solenoid 193, wire 184, contact 183, pole 137, wire 138 and line wire 125. This moves the switch pole 188 of the ratchet-operated switch 187 into engagement with stationary contact 223. This sets up a circuit whereby a selected vegetable-conveyor motor 87 may be energized by suitably-positioning the pole 216 of selector switch 215 to engage the stationary contact 214 corresponding to the desired vegetable to be dispensed. Thus, with pole 216 in engagement with a contact 214, actuation of the vegetable-delivery push button 20 simultaneously closes all of the sections 211 of the multiple-section switch 212. This energizes the relay 200 associated with the motor 87 of the selected vegetable conveyor through a circuit comprising line wire 126, wire 218, the winding of the relay 200, wire 210, normally-closed switch 105, the push-button section 211, wire 213, the selected switch contact 214, the arm 216, wire 200, normally-closed switch 221, wire 222, contact 223, pole 188 and a wire 230 connecting pole 188 to line wire 125. Relay 200 is held closed through a holding circuit comprising line wire 126, wire 218, the winding of relay 200, wire 210, contact 209, pole 202, contact 207, wire 205, the normally-closed mercury switch 115, and line wire 125. The motor 87 associated with the energized relay 200 likewise becomes energized by the bridging of the contacts 199, 204 by the relay pole 201, causing the associated vertical conveyor 85 to operate and deliver the selected vegetable dish to the conveyor belt 47, by the counterclockwise rotation of the lower shelf member 100 in FIGURE 5, as above-described. Simultaneously, the upper right shelf member 100 sweeps past and momentarily engages the switch arm 116, opening the mercury switch 115 and releasing the relay 200, causing the motor 87 to become de-energized.

The previous energization of the relay 200 causes the contacts 219 and 208 to be bridged by the pole 203 of the relay, connecting wire 184 to line wire 125 through the switch 115, causing the ratchet solenoid 193 to be again energized. This moves the arm 188 through a second step, bringing it into engagement with the contact 224. This places the system in a condition for a further selection of a vegetable dish to be dispensed. The selection is made by operating knob 22 to move the arm 216 into engagement with another stationary contact 214, in the circuit of the relay 200 correspondingly to the selected second vegetable. The second vegetable dish is delivered by again actuating the push button 20, causing the conveyor motor 87 of the conveyor containing the desired second vegetable to become energized and to deliver the second vegetable onto the moving conveyor belt 47. The second selected vegetable-conveyor motor 87 remains energized until its associated mercury switch 115 opens.

The energization of the second vegetable-conveyor control relay 200, as above-described, causes its contacts 208, 219 to be bridged by its pole 203, again connecting the wire 184 to the line wire 125 through the limit switch contact 115 of the associated circuit for the conveyor motor 87. This delivers a third voltage pulse to the ratchet solenoid 193, causing the arm 188 to be advanced through a third step into engagement with the stationary contact 186. Thus, substantially simultaneously with the second actuation of the vegetable tray-delivery push button 20, the wire 185 is connected to line wire 125 through a contact 186, pole 188, and wire 230. This energizes the latched timing relay 166 through a circuit comprising wire 185, the winding of relay 166, wire 162 and line wire 126. Relay 166 remains energized only momentarily, namely, only until pawl 191 disengages from ratchet sector 189, but the relay 166 remains latched-down for a predetermined period of time. When the pole 171 of relay 166 bridges contacts 172 and 173, the conveyor motors 48 and 62 become energized, and likewise, the oven-control relay 182 becomes energized. The belt conveyors begin to move and the selected partially-cooked food articles are conveyed thereby through the oven 15 in the manner above-described for completion of cooking and for ultimate delivery through the discharge duct 16 onto the table 13. As previously-mentioned, the speed of the oven-conveyor motor 62 may be adjusted by means of its control rheostat 180 to provide the required amount of cooking of the selected food articles.

At the end of its latching time, the contact mechanism of relay 166 releases, opening the energizing circuit of motors 62 and 48 and relay 182 by the disengagement of pole 171 from contacts 172 and 173. Pole 163 moves into engagement with contacts 164 and 165, connecting wire 162 to line wire 125, so that the green pilot lamp 23 becomes energized, showing the completion of the delivery cycle and the restoration of starting conditions.

Simultaneously with the energization of the latched timing relay 166, the release solenoid 195 is energized, since the wire 196 is connected to the line wire 125 through contact 186, switch arm 188 and wire 230. This releases the sector element 189, allowing the spring 190 to return arm 188 rapidly to its starting position. The follower arm 227 is sufficiently damped, frictionally, or by other suitable means, so that the relatively rapid rotation of the star wheel 226 keeps switch 221 open until the switch arm 188 has returned to its starting position, namely, in engagement with the blank stationary contact 191'.

In operation, the customer inserts the proper number of coins in the manner above-described, employing the coin-receiving device 19 to receive the coins and actuating the device successively, whereby to close the coin-control switch 161 once for each coin and thereby to successively energize the ratchet relay 153 to the required number of steps corresponding to the selected meat article. This brings the switch arm 145 into engagement with the corresponding contact 143, 146 or 147 as above-described. The customer then actuates the push-button switch 21, corresponding to the selected meat article, which accordingly energizes the associated relay 129 and simultaneously energizes the associated meat dish-conveyor motor 86, driving the associated meat conveyor through one step, which causes the operation of the associated limit switch 115'. Operation of said limit switch de-energizes the conveyor motor and also opens the holding circuit for the relay.

As above-described, operation of the limit switch 115' energizes the release relay 154, releasing the ratchet sector 150 so that the switch arm 145 returns to its starting position. At the same time, the vegetable dish-ratchet relay 193 is energized momentarily, moving the ratchet sector 189 through one step, and causing its associated switch arm 188 to move into engagement with the contact 223, as above-described. The customer then sets the vegetable selector knob 22 so as to move the switch arm 216 into engagement with a selected stationary contact 214, corresponding to a first desired vegetable dish, after which the customer actuates the vegetable selecting push-button 20, closing the contacts of the multiple switch 212. This energizes the relay 200 corresponding to the selected vegetable dish, which simultaneously energizes the associated vegetable-conveyor motor 87. After the conveyor has operated through one step, delivering a vegetable dish onto the belt 47, the limit switch 115 opens, de-energizing the relay 200 of the motor 87. The previous energization of the relay 200 moves the ratchet sector 189 through another step, since the ratchet relay 193 receives a pulse of voltage. Thus, arm 188 is in engagement with stationary contact 224, thus preparing the circuit for delivery of the second selected vegetable dish. The customer then operates the selector knob 22 to move the switch arm 216 into engagement with another stationary contact 214, in circuit with the control relay associated with the second desired vegetable dish. Thereupon the customer operates the push button 20 to close the multiple-switch unit 212, which causes energization of the relay 200 associated with the circuit of the vegetable-conveyor motor 87 corresponding to the second vegetable dish choice. Said last-named conveyor motor operates through one step until its associated limit switch 115 opens, de-energizing its control relay 200. During the energization of said control relay the ratchet relay 193 is again pulsed, advancing the ratchet wheel sector 189 through a further step so that switch arm 188 engages stationary contact 186.

When switch arm 188 moves into contact with stationary contact element 186, the latched relay 166 is energized, moving pole 171 into bridging contact with stationary contact elements 172 and 173, as above-described, which energizes the conveyor motors 62 and 48 and also the control relay 182 for the high-frequency oven 15. The selected meat and vegetable dishes are then transported by the conveyor belt 47, moving to the left, as viewed in FIGURE 3, passing beneath the flexible gate member 72, which insures that only one tray 71 at a time passes therebeneath, the selected trays of food then moving along the transfer plate 59 onto the belt 60 of the oven conveyor 61. The selected food articles then pass through the high-frequency oven 15 at a rate of speed such that they are completely cooked when then finally emerge from the left end of the belt onto the inclined bottom wall 69 of the discharge duct 16. The cooked food articles slide down the inclined bottom wall 69 of duct 16 onto the table 13 and are ready for consumption.

Meanwhile, the release relay 195 has been energized, resulting from the engagement of switch pole 188 with stationary contact 186, which elevates pawl 191, releasing the ratchet-wheel sector 189 so that switch arm 188 is returned to its starting position in engagement with the stationary contact 191', as shown in FIGURE 11B. After the latching time period of the relay 166, pole 171 disengages from contacts 172 and 173, de-energizing conveyor motors 62 and 48 and the oven-control relay 182, and pole 163 moves into engagement with stationary contacts 164 and 165, setting up the apparatus for a new cycle of operation.

It will be noted that the conveyor motors 48 and 62 remain de-energized until the second vegetable dish has been deposited on the conveyor belt 47, the movement of the second selected vegetable dish onto the conveyor belt taking place substantially simultaneously with the movement of the switch arm 188 into engagement with its final contact 186. Thus, movement of the belt conveyors 44 and 61 does not commence until the selected meats and vegetable trays have been deposited on the top run of conveyor belt 47 in position for movement into the high-frequency oven 15.

As previously-mentioned, the meat and food articles stored in the cabinet 12 are pre-cooked to a degree such that cooking thereof can be completed by passing them through the high-frequency oven 15 for the period of time established by the setting of the speed-control rheostat 180.

The food-dispensing machine above-described may be used to vend food products that are packaged, but not cooked, such as table eggs in cartons. "Take-out" dinners can be cooked and packaged and can be then dispensed from the vending machine, for example, may be placed on suitable insulated dinner plates to keep the food warm for several hours. Thus, the machine can be employed either with or without high-frequency ovens.

Also, the vending machine can be easily modified by adding additional sections thereto or by removing sections therefrom, with corresponding changes in length of the main conveyor belt assembly.

While a certain specific embodiment of an improved machine for dispensing food articles has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A food-article dispensing machine comprising an oven, first conveyor means extending through said oven to carry food articles through the oven, second conveyor means located to deliver food articles to said first conveyor means, means to activate said second conveyor means, and means to operate said first conveyor means for a predetermined period of time responsive to the activation of said second conveyor means, said second conveyor means comprising a first group of vertical conveyors adapted to deliver food articles of one class, a second group of vertical conveyors adapted to deliver food articles of a second class, means to selectively actuate said first group of vertical conveyors, and means to actuate the second group of vertical conveyors following the actuation of a selected conveyor of said first group, and wherein the means to actuate said first conveyor means is responsive to the actuation of the last vertical conveyor, and wherein the means to selectively actuate said first group of vertical conveyors includes a coin-controlled switch provided with coin-receiving means and means to close said switch once for each coin deposited, and means to select one of said first group of vertical conveyors for actuation in accordance with the number of times said coin-controlled switch closes.

2. The food-article dispensing machine of claim 1, and a housing surrounding said first and second group of vertical conveyors, means to circulate air through said housing, and means to refrigerate the circulating air.

3. The food-article dispensing machine of claim 1, and wherein said first conveyor means comprises a first substantially horizontal belt conveyor extending through said oven, a second substantially horizontal belt conveyor located subjacent the second conveyor means, transfer plate means extending between the second and first horizontal belt conveyors, respective motors drivingly-connected to said belt conveyors, and means for adjusting the speed of the first horizontal belt conveyor to provide a predetermined time of travel of its top run through the oven.

4. The food-article dispensing machine of claim 1, wherein said first conveyor means is substantially horizontal, and wherein said first and second group of vertical conveyors are located above and on opposite sides of the first conveyor means, and respective inclined guide members extending downwardly and inwardly from the lower portions of said vertical conveyors and terminating immediately above opposite side marginal portions of said first conveyor means.

5. The food-article dispensing machine of claim 1, and wherein the first group of vertical conveyors is provided with respective drive motors, a source of current, and a multiple-position selecting switch connected between said drive motors and said source of current, and wherein said selecting means comprises an electromagnetic stepping device drivingly-connected to said selecting switch and circuit means connecting said stepping device to said source of current through said coin-controlled switch.

6. The food-dispensing machine of claim 5, and wherein the second group of vertical conveyors is also provided with respective drive motors and a second multiple-position selecting switch and circuit means connecting said second selecting switch between said last-name drive motors and said source of current.

7. The food-dispensing machine of claim 6, and wherein said last-named circuit means includes a third multiple-position switch, electromagnetic drive means operatively-connected to said third-multiple-position switch, and means to energize said electromagnetic drive means responsive to the operation of said selected conveyor of the first group.

8. The food-dispensing machine of claim 7, and wherein the first conveyor means is provided with a driving motor, and wherein the means to actuate said first conveyor means comprising a control relay having contacts connected between said source and said last-named driving motor, and means to connect said control relay to said source responsive to a predetermined number of steps of operation of said third multiple-position switch.

9. The food-dispensing machine of claim 8, and wherein said control relay is of the timed-latching type wherein said contacts remain closed a timed period following momentary energization of the relay, and means to open the connection of said control relay to the source immediately following said predetermined number of steps of operation of said third multiple-position switch.

10. The food-dispensing machine of claim 9, and wherein said control relay is provided with additional contacts which are normally closed and which are opened when the control relay is in latched condition, said additional contacts being connected in series with said coin-controlled switch.

11. The food-dispensing machine of claim 5, and wherein said electromagnetic stepping device comprises a solenoid having a movable plunger, a rotatable ratchet member, and a pawl member connected to said plunger and drivingly-engaging said ratchet member.

12. The food-dispensing machine of claim 5, wherein the selecting switch is provided with means biasing it toward a starting position, and means disengaging the pawl member from the ratchet member responsive to operation of the selected vertical conveyor of said first group through a delivery step, whereby to allow the selecting switch to return to said starting position.

13. The food-dispensing machine of claim 12, and wherein said disengaging means comprises a release solenoid operatively-connected to said pawl member, switch means closing responsive to the operation of said selected vertical conveyor through said delivery step, and circuit means connecting said release solenoid to said source through said last-named switch means.

14. The food-dispensing machine of claim 6, and wherein said second multiple-position selecting switch is manually-operated.

15. The food-dispensing machine of claim 8, and means to return said third multiple-position switch to its starting position responsive to the completion thereof of said predetermined number of steps of operation.

16. The food-dispensing machine of claim 15, and wherein said third multiple-position switch has at least three steps of operation, and wherein said return means is activated responsive to the third step of operation of said third multiple-position switch.

17. The food-dispensing machine of claim 16, and wherein said second multiple-position selecting switch is manually-operated and is operable when the third multiple-position switch has been activated through either of its first two steps of operation.

References Cited

UNITED STATES PATENTS

| | | | |
|---|---|---|---|
| 2,831,419 | 4/1958 | Timm. | |
| 2,834,510 | 5/1958 | Cenotti | 221—150 X |
| 3,160,255 | 12/1964 | Ferraro et al. | 194—1 |
| 3,237,804 | 3/1966 | Bardy et al. | 221—150 X |

ROBERT B. REEVES, *Primary Examiner.*

STANLEY H. TOLLBERG, *Examiner.*